(12) United States Patent
Shin et al.

(10) Patent No.: US 7,760,283 B2
(45) Date of Patent: Jul. 20, 2010

(54) DISPLAY DEVICE USING EXTERNAL LIGHT

(75) Inventors: Yoon-cheol Shin, Seoul (KR);
Moon-cheol Kim, Suwon-si (KR);
Kyong-wook Kim, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 381 days.

(21) Appl. No.: 11/655,926

(22) Filed: Jan. 22, 2007

(65) Prior Publication Data
US 2007/0171322 A1  Jul. 26, 2007

(30) Foreign Application Priority Data
Jan. 23, 2006  (KR) .................. 10-2006-0006807

(51) Int. Cl.
*G02F 1/1333* (2006.01)
(52) U.S. Cl. .......................... 349/58; 349/61
(58) Field of Classification Search .............. 349/58,
349/61; 362/632, 633, 634; 455/566
See application file for complete search history.

(56) References Cited

U.S. PATENT DOCUMENTS

| 6,452,577 B1 * | 9/2002 | Gale et al. ............... 345/87 |
| 7,197,338 B2 * | 3/2007 | Ozawa ................... 455/566 |
| 2005/0122739 A1 * | 6/2005 | Huang et al. ............ 362/608 |

FOREIGN PATENT DOCUMENTS

| JP | 11-073122 A | 3/1999 |
| JP | 11-073123 A | 3/1999 |
| JP | 2002-244131 A | 8/2002 |

\* cited by examiner

*Primary Examiner*—David Nelms
*Assistant Examiner*—Nathanael R Briggs
(74) *Attorney, Agent, or Firm*—Sughrue Mion, PLLC

(57) ABSTRACT

A display device including: a main body through which external light is transmitted, the main body having a display panel on which an image is formed; and a cover slidably coupled to the main body, wherein external light is supplied to the main body when the cover is slid to expose the main body. Accordingly, the display device can display an image by selectively using external light such as sunlight or illumination light, or a backlight unit.

10 Claims, 9 Drawing Sheets

DISPLAY DEVICE USING EXTERNAL LIGHT

CROSS-REFERENCE TO RELATED PATENT APPLICATIONS

This application claims priority from Korean Patent Application No. 10-2006-0006807, filed on Jan. 23, 2006, in the Korean Intellectual Property Office, the disclosure of which is incorporated herein in its entirety by reference.

BACKGROUND OF THE INVENTION

1. Field of the Invention

Apparatuses consistent with the present invention relate to a display device using external light and, more particularly, to a display device using natural light or illumination light as a light source to improve visibility and reduce power consumption.

2. Description of the Related Art

With the development of communication and display technology, a number of portable terminals have recently been developed. Examples of portable terminals include personal digital assistants (PDAs), portable multimedia players (PMPs), and digital multimedia broadcasting (DMB). Since liquid crystal displays (LCDs), a type of light receiving flat displays, cannot emit light by themselves, they produce an image by selectively transmitting illumination light radiated from a light source onto each pixel. To this end, backlight units are installed at a rear side of the LCDs.

Backlight units are classified according to the arrangement of light sources into a direct light type and an edge light type. The direct light type is configured such that a plurality of light sources are installed under an LCD to directly emit light onto a liquid crystal panel. The direct light type is suitable for large screen display devices such as LCD TVs larger than 30 inches since the light sources can be freely and effectively installed on a wide area. The edge light type is suitable for displays of portable displays since a light source should be installed at a sidewall of a light guide panel.

When portable terminals are used outdoors under sunlight, the brightness of a screen may be too dark to see. Also, portable terminals generally use high power consuming batteries, and the batteries should always be charged before the portable terminals are used.

SUMMARY OF THE INVENTION

The present invention provides a display device using sunlight or illumination light as a light source to improve visibility and reduce power consumption.

According to an aspect of the present invention, there is provided a display device comprising: a main body through which external light is transmitted, the main body having a display panel on which an image is formed; and a cover slidably coupled to the main body, wherein external light is supplied to the main body when the cover is slid to expose the main body.

The cover may comprise: a light guide panel which guides light to the main body; a light source which supplies light to the light guide panel; and a first reflection plate which reflects light traveling through the light guide panel.

The light source may be located on a side of the light guide panel that is closer to the main body when the cover is slid to expose the main body, such that light output from the light source is emitted to the main body.

The display device may further comprise a reflecting unit disposed around the light source, wherein the reflecting unit is rotated to reflect light output from the light source to the main body when the cover is slid to expose the main body.

The main body may comprise: a light guide panel; and a light source supplying light to the light guide panel, and the cover may comprise a first reflection plate which reflects light traveling through the light guide panel.

The display device may further comprise a second reflection plate disposed adjacent to the main body to be opened and closed such that the second reflection plate is opened to reflect external light to the main body when the cover is slid to expose the main body.

The display device may further comprise an auxiliary light source disposed adjacent to the main body to emit light to the main body when the cover is slid to expose the main body.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

The present invention will now be described more fully with reference to the accompanying drawings, in which exemplary embodiments of the invention are shown.

Figure 1:
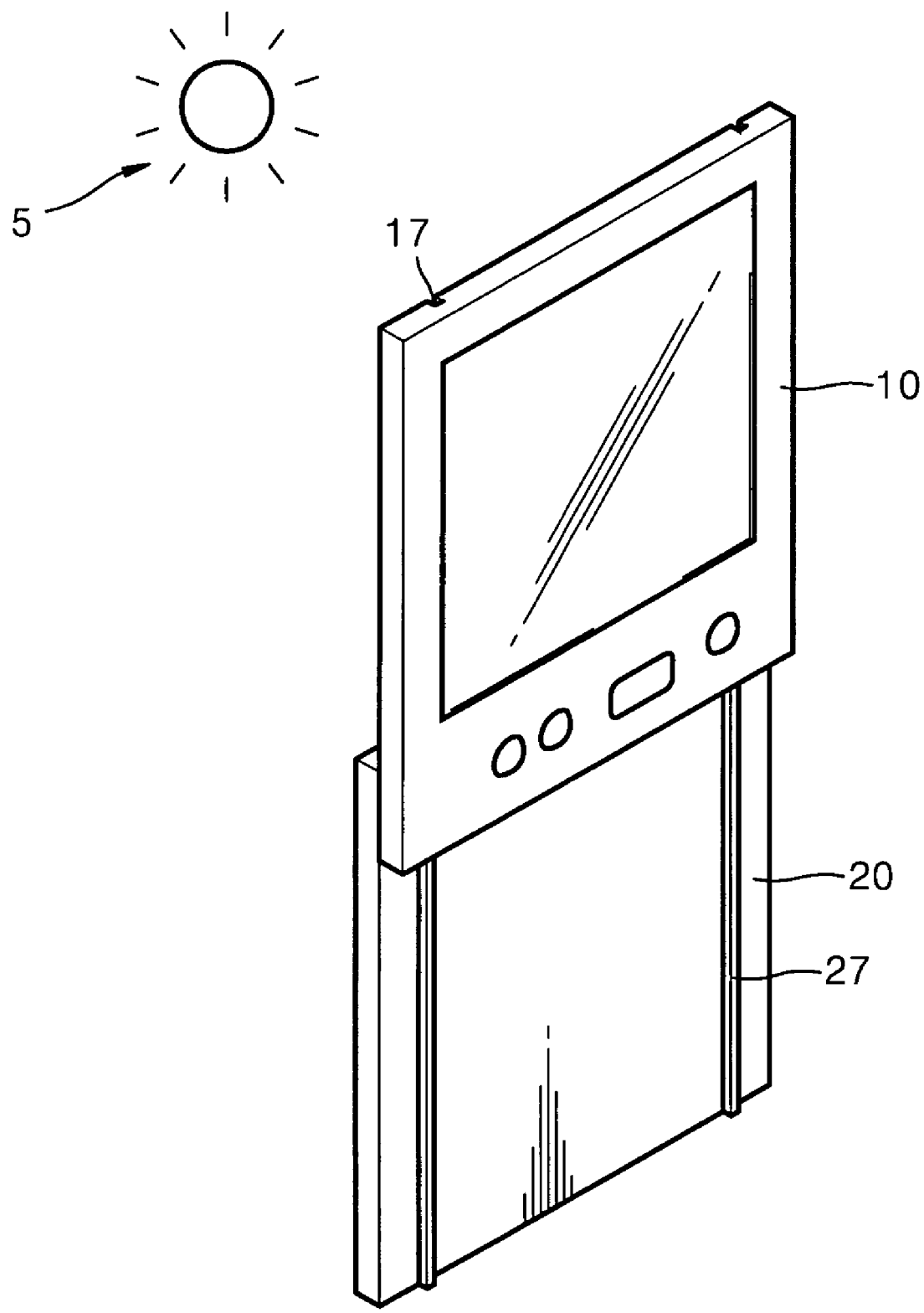
FIG. 1 is a perspective view of a display device according to an exemplary embodiment of the present invention.

FIG. 1 is a perspective view of a display device according to an exemplary embodiment of the present invention. Referring to FIG. 1, the display device includes a main body 10, and a cover 20 slidably coupled to the main body 10. When the cover 20 slides down from the display body 10, external light 5 such as sunlight or illumination light is transmitted through the main body 10. The main body 10 includes a display panel on which an image is formed. Rail protrusions 27 are formed on the cover 20 to slide from the main body 10, and rail grooves 17 corresponding to the rail protrusions 27 are formed in the main body 10.

Figure 2:
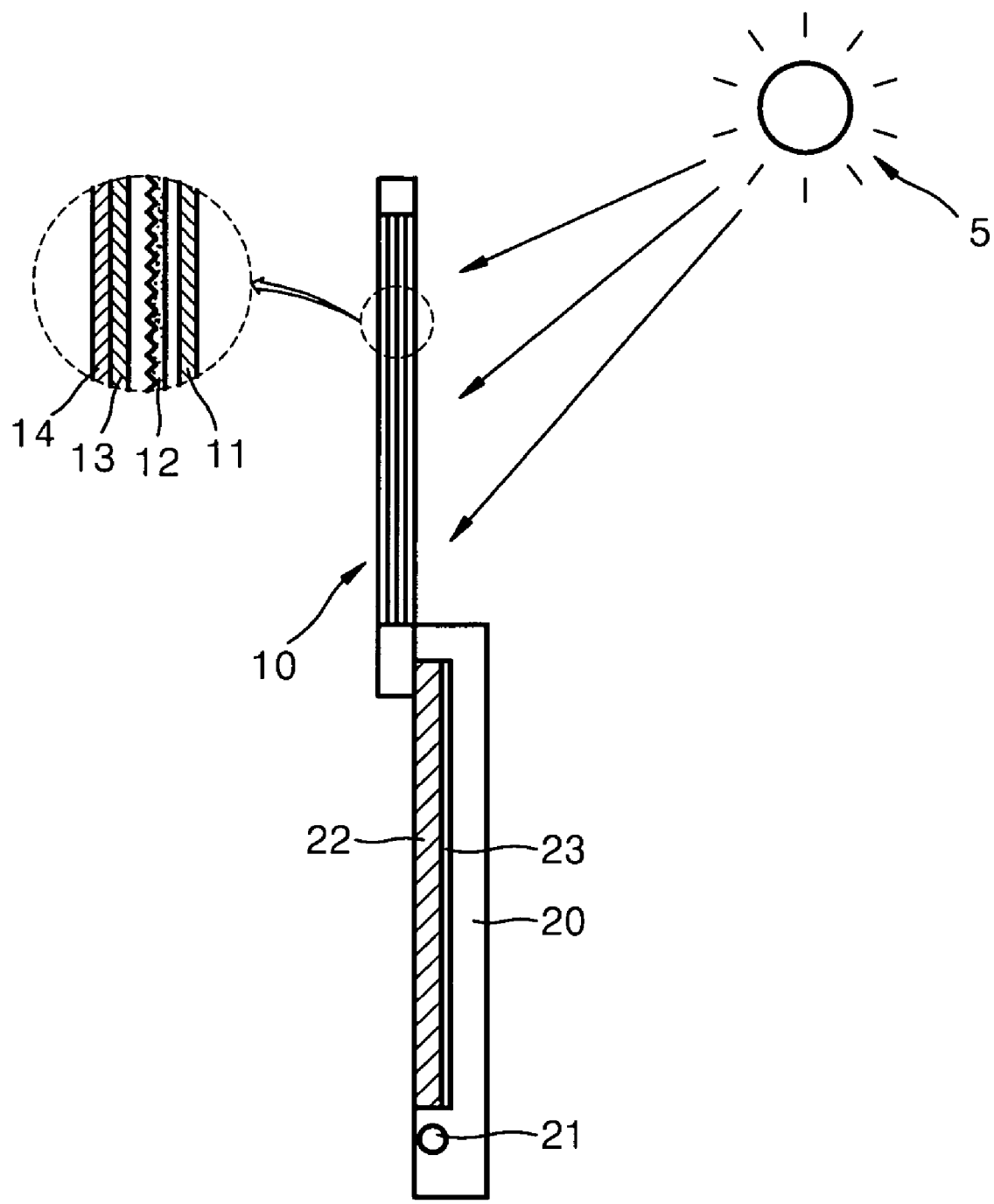
FIG. 2 is a cross-sectional view of the display device of FIG. 1.

FIG. 2 is a cross-sectional view of the display device of FIG. 1. Referring to FIG. 2, the main body 10 includes a diffusion plate 11 for diffusing light, a first prism sheet 12 for correcting the path of light, a second prism sheet 13 orthogonal to the first prism sheet 12, and a display panel 14 for modulating light according to an input image signal to form an image.

The first and second prism sheets 12 and 13 refract and focus light output from the diffusion plate 11 to improve the directivity and brightness of the light. The display panel 14 may be a liquid crystal panel, and forms an image by modulating external light according to an input image signal.

The components constituting the main body 10 are made of light transmissive materials such that external light can be transmitted through the components to the display panel 14 and the display panel 14 can form an image using the transmitted external light. The cover 20 includes a light source 21, a light guide panel 22 guiding light output from the light source 21 to the display panel 14, and a first reflection plate 23 for reflecting light traveling through the light guide panel 22 to the display panel 14.

When the main body 10 and the cover 20 are coupled to each other, light output from the light source 21 is guided by the light guide panel 22 to pass through the diffusion plate 11 and the first and second prism sheets 12 and 13. An image is formed on the display panel 14 using the light that has passed through the first and second prism sheets 12 and 13. Meanwhile, to use external light outdoors under sunlight or when there is illumination light indoors, the cover 20 is slid down from the main body 10 such that the external light comes from the back of the main body 10. When viewing a screen outdoors in the sunlight, the liquid crystal screen is difficult to see because the brightness of the light source of the display device is weaker than that of the sunlight. However, when using the sunlight as a light source, the display screen can be clearly viewed. Also, since the light source in the display device is not needed, power for driving the light source can be saved.

On the other side, when the cover 20 is slid down from the main body 10, the cover 20 is moved so as not to cover an effective area of the screen such that the external light can be uniformly emitted to the screen.

Although the light guide panel 22 is installed on the cover 20 in FIG. 2, the light guide panel 22 may be installed on the main body 10. The light source 21 is disposed on at least one of two sides of the light guide panel 22, and emits light to the light guide panel 22 to form an image when the cover 20 is coupled to the main body 10.

Figure 3:
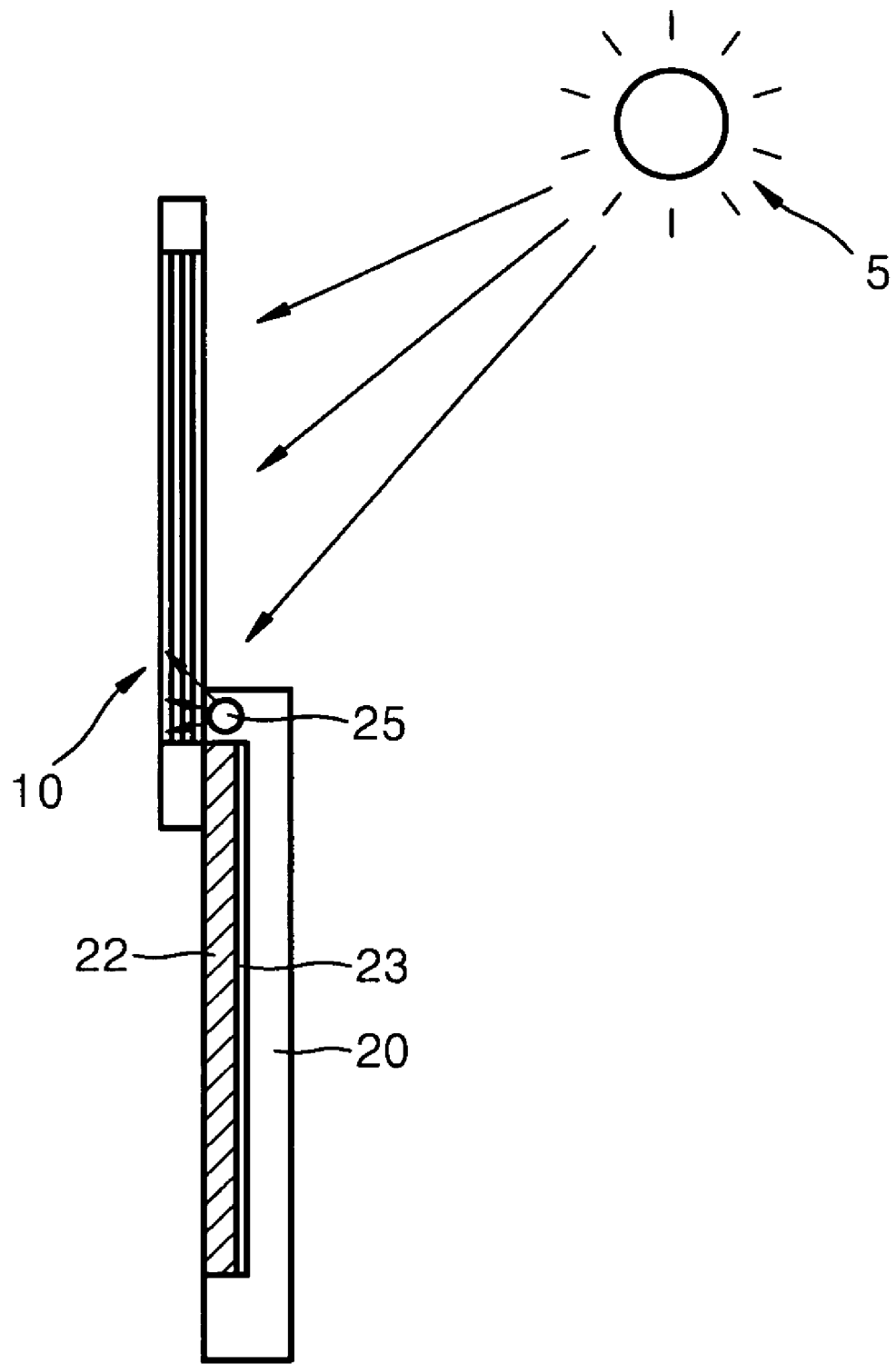
FIG. 3 is a cross-sectional view of a modification of the display device of FIG. 2.

FIG. 3 is a cross-sectional view of a modification of the display device of FIG. 2. Referring to FIG. 3, a display light source 25 is disposed on a side of the light guide panel 22 where the main body 10 and the cover 20 overlap each other to emit light to the main body 10 when the cover 20 slides down with respect to the main body 10. In this structure, when the main body 10 and the cover 20 are coupled to each other, the display panel 14 forms an image using light emitted from the light source 25. When the cover 20 is slid to expose the main body 10, the main body 10 forms an image using external light 5, and if the external light 5 is insufficient, the light source 25 may be used as an auxiliary light source.

Figure 4A:
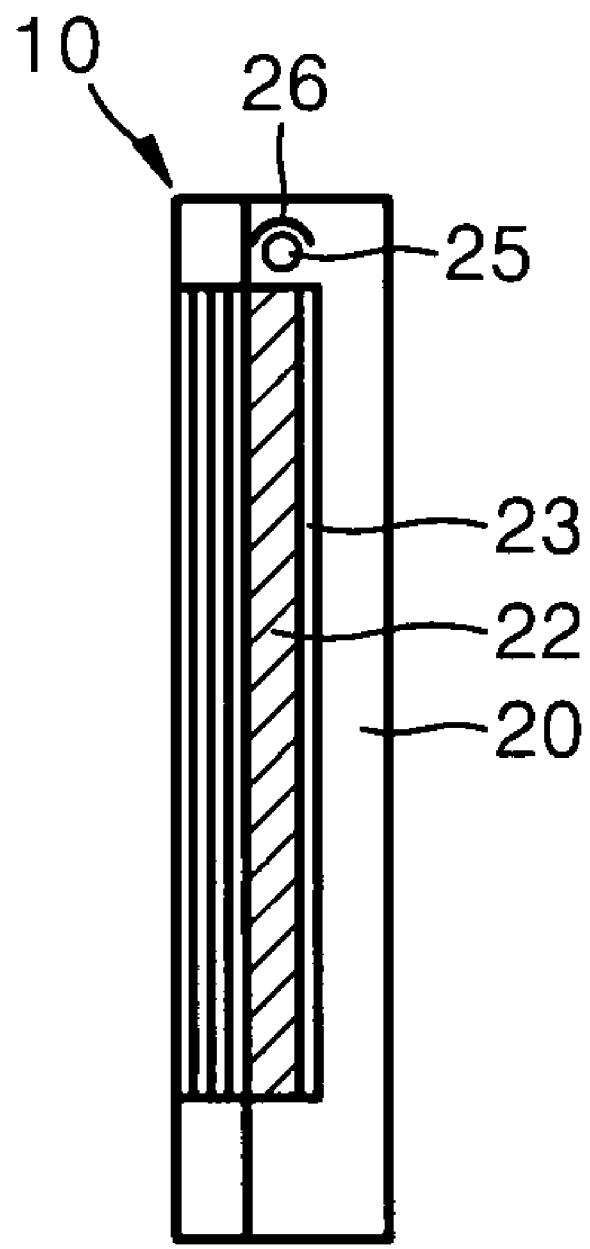
FIG. 4A is a cross-sectional view of the display device of FIG. 3 with a light source reflecting unit, illustrating a state where a main body and a cover are coupled to each other.
Figure 4B:
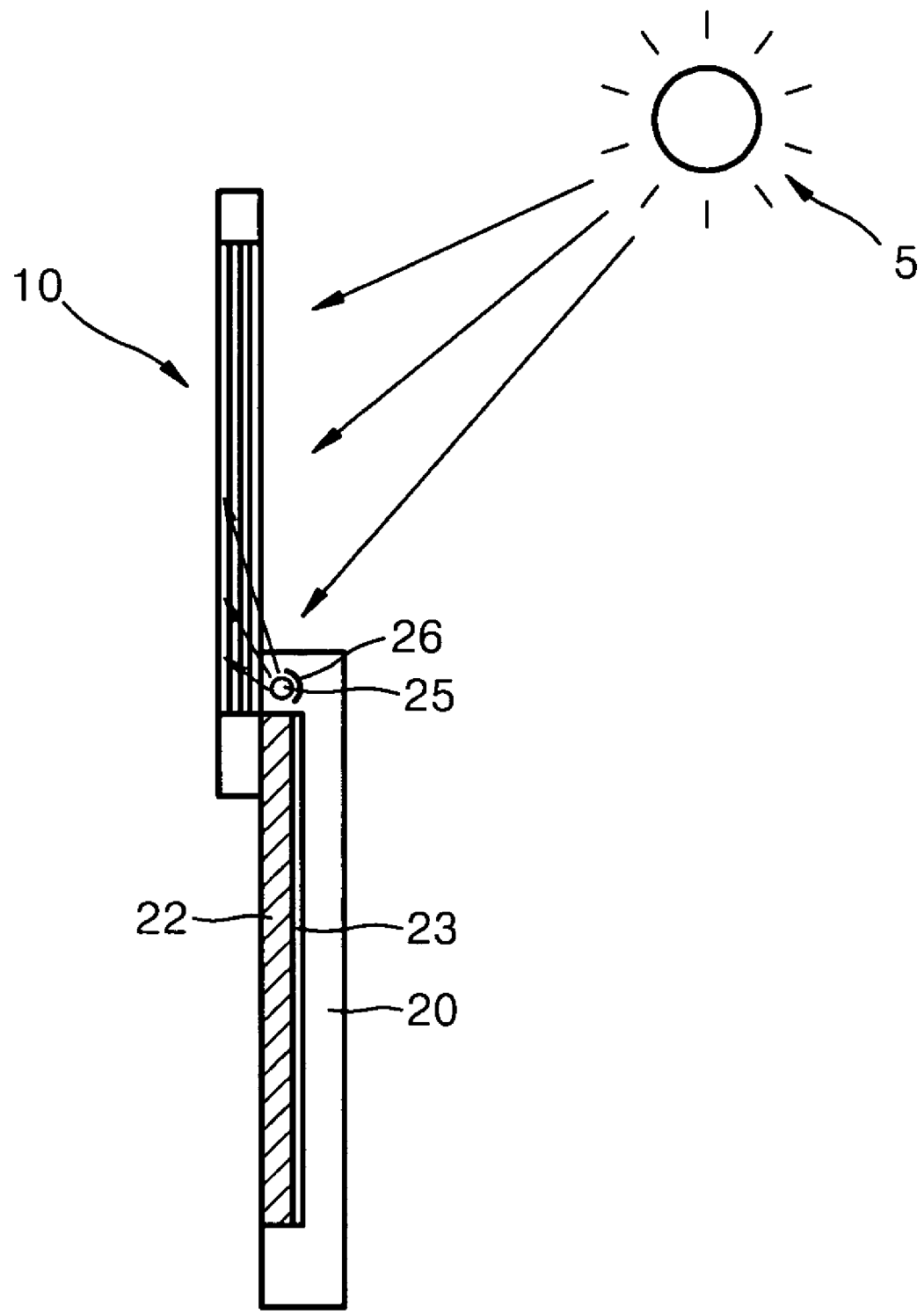
FIG. 4B is a cross-sectional view of the display device of FIG. 4A, illustrating a state where the cover slides down from the main body.

FIG. 4A is a cross-sectional view of the display device of FIG. 3 but with a light source reflecting unit 26 disposed around the light source 25. Referring to FIG. 4A, the reflecting unit 26 reflects light, which is emitted to the back of the light source 25, to the light guide panel 22 to improve light efficiency. FIG. 4B is a cross-sectional view of the display device of FIG. 4A, but illustrating a state where the cover 20 has been slid down from the main body 10. Referring to FIG. 4B, when the cover 20 slides down from the main body 10, the reflecting unit 26 is rotated to reflect light from the light source 25 to the main body 10. Light efficiency can be further improved when the light source 25 is used as an auxiliary light source. The light source 25 may be manually turned on or off using a switch.

Figure 5:
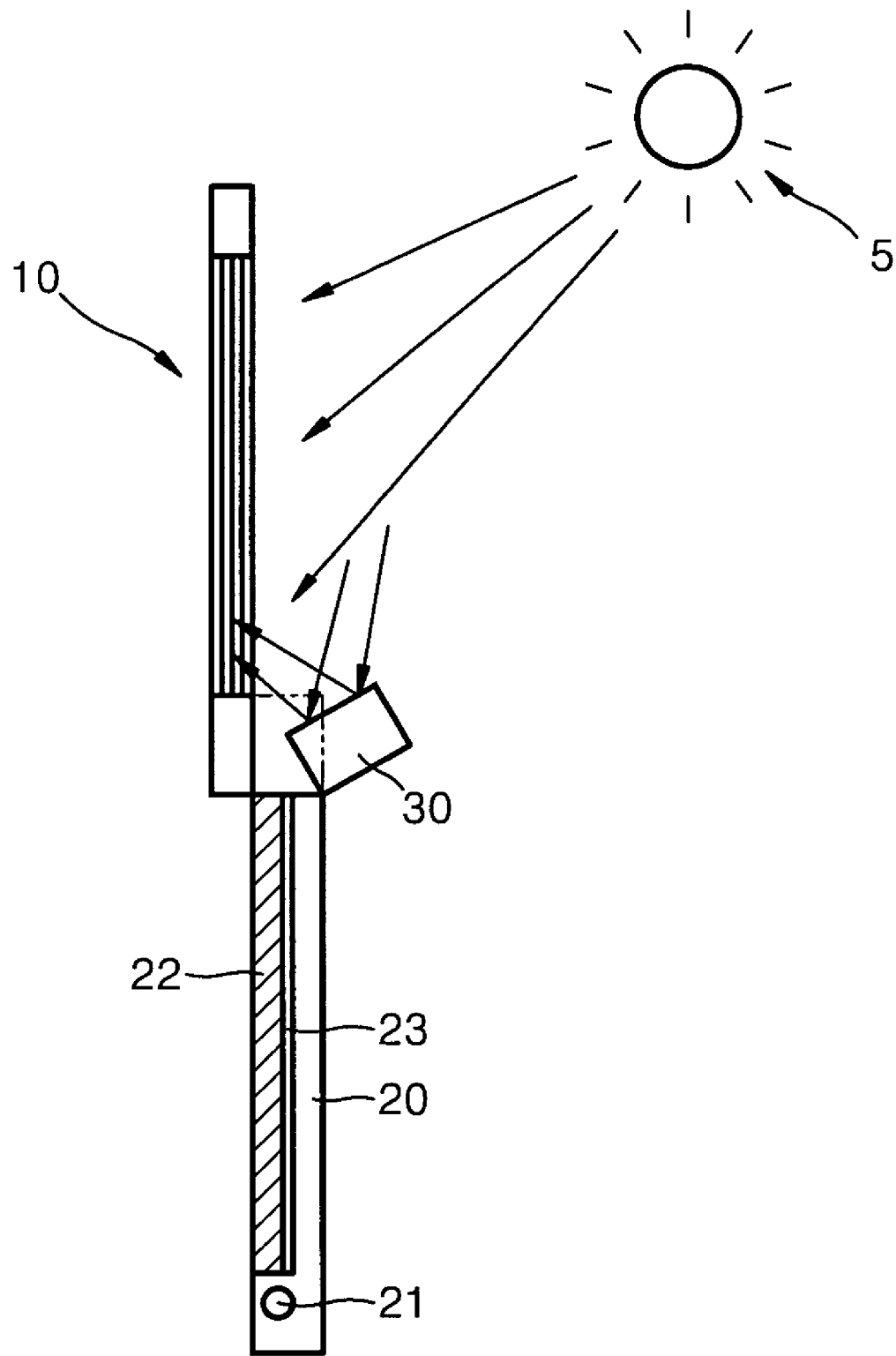
FIG. 5 is a cross-sectional view of the display device of FIG. 2 with a reflection plate.

FIG. 5 is a cross-sectional view of the display device of FIG. 2 with a second reflection plate 30. Referring to FIG. 5, the second reflection plate 30 is disposed on the cover 20 to be opened and closed. When the cover 20 is slid down from the main body 10, the second reflection plate 30 is opened to face the main body 10, such that both external light directly incident on the main body 10 and external light reflected by the second reflection plate 30 and then incident on the main body 10 are supplied to the main body 10 to improve light efficiency. The light source 21 disposed on at least one of the two sides of the light guide panel 22 to supply light to the light guide panel 22 may be disposed on a side of the light guide panel 22, opposite to the side of the light guide panel 22 where the second reflection plate 30 is disposed.

Figure 6:
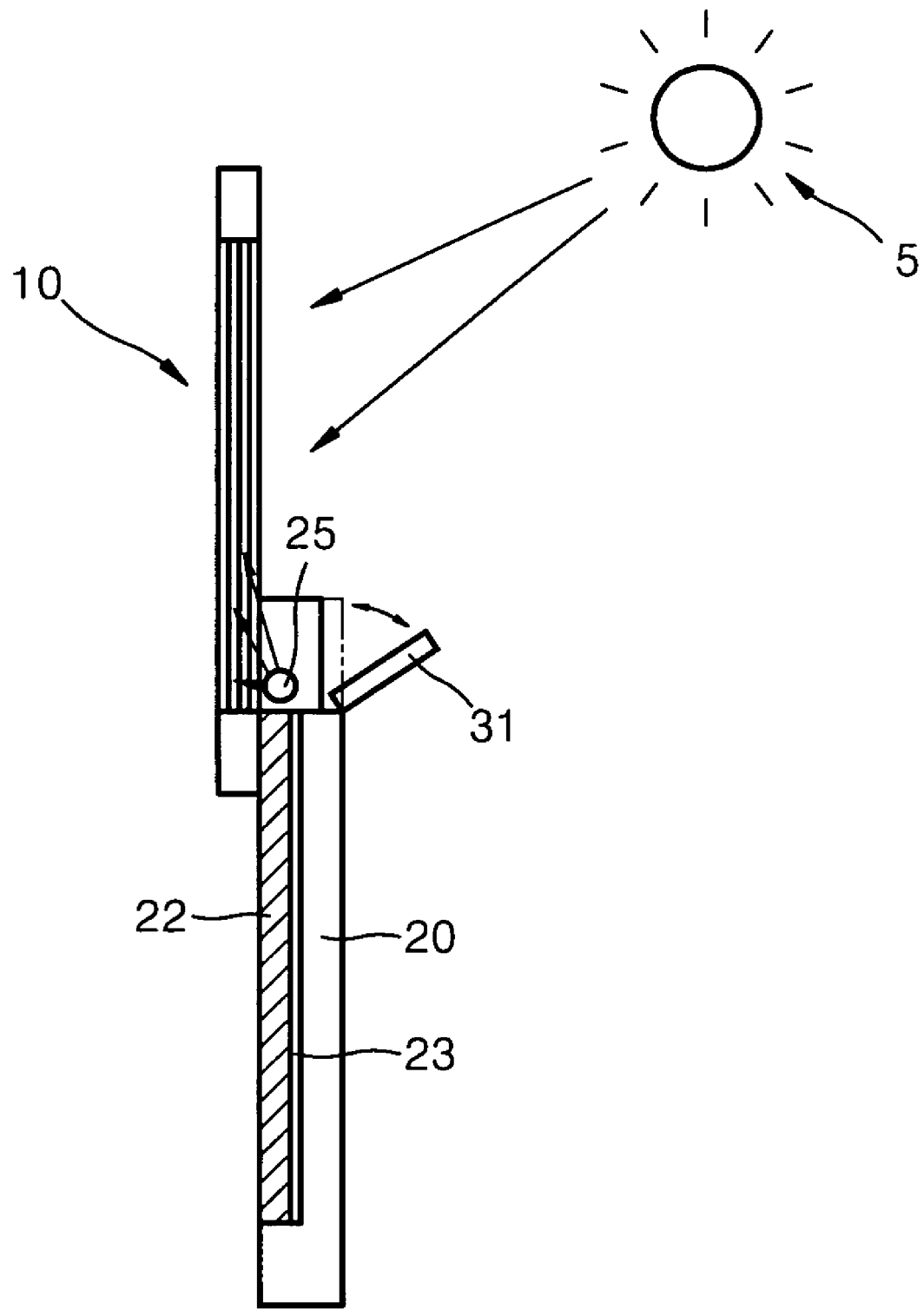
FIG. 6 is a cross-sectional view of the display device of FIG. 3 with a reflection plate.

FIG. 6 is a cross-sectional view of the display device of FIG. 3 with a third reflection plate 31. Referring to FIG. 6, when the cover 20 is slid down from the main body 10, the light source 25 of the light guide panel 22 is disposed close to the main body 10, and the third reflection plate 31 is disposed on the cover 20 to be opened and closed. When external light supplied to the main body 10 is insufficient and thus the screen is dark, the third reflection plate 31 is opened to supply more external light to the main body 10, or the light source 25 is used as an auxiliary light source to supply light to the main body 10. Or, the light source 25 and the third reflection plate 31 can be used together to supply more light to the main body 10.

Figure 7:
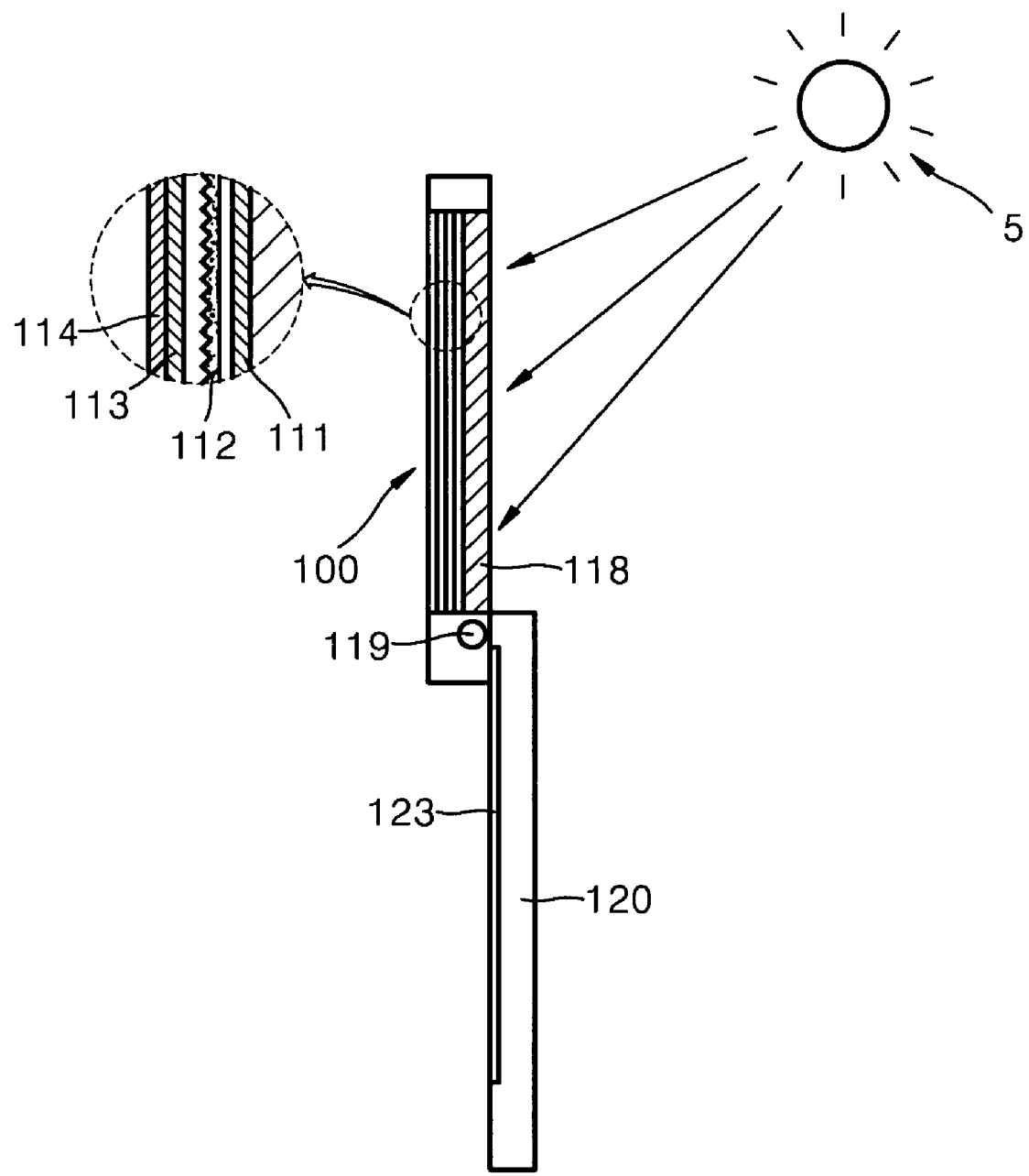
FIG. 7 is a cross-sectional view of a display device according to another exemplary embodiment of the present invention.

FIG. 7 is a cross-sectional view of a display device according to another exemplary embodiment of the present invention. Referring to FIG. 7, the display device includes a main body 100 having a light guide panel 118, and a cover 120 slidably coupled to the main body 100. A light source 119 is disposed on at least one of two sides of the light guide panel 118. A diffusion plate 111, a first prism sheet 112, a second prism sheet 113 orthogonal to the first prism sheet 112, and a display panel 114 modulating light according to an input image signal to form an image, are arranged sequentially from the light guide panel 118. A first reflection plate 123 is disposed on the cover 120. When the main body 110 and the cover 120 are coupled to each other, light output from the light source 119 is incident on the light guide panel 118, and light traveling through the light guide panel 118 is reflected by the first reflection plate 123 to pass through the diffusion plate 111 and the first and second prism sheets 112 and 113 and then be incident on the display panel 114.

Figure 8:
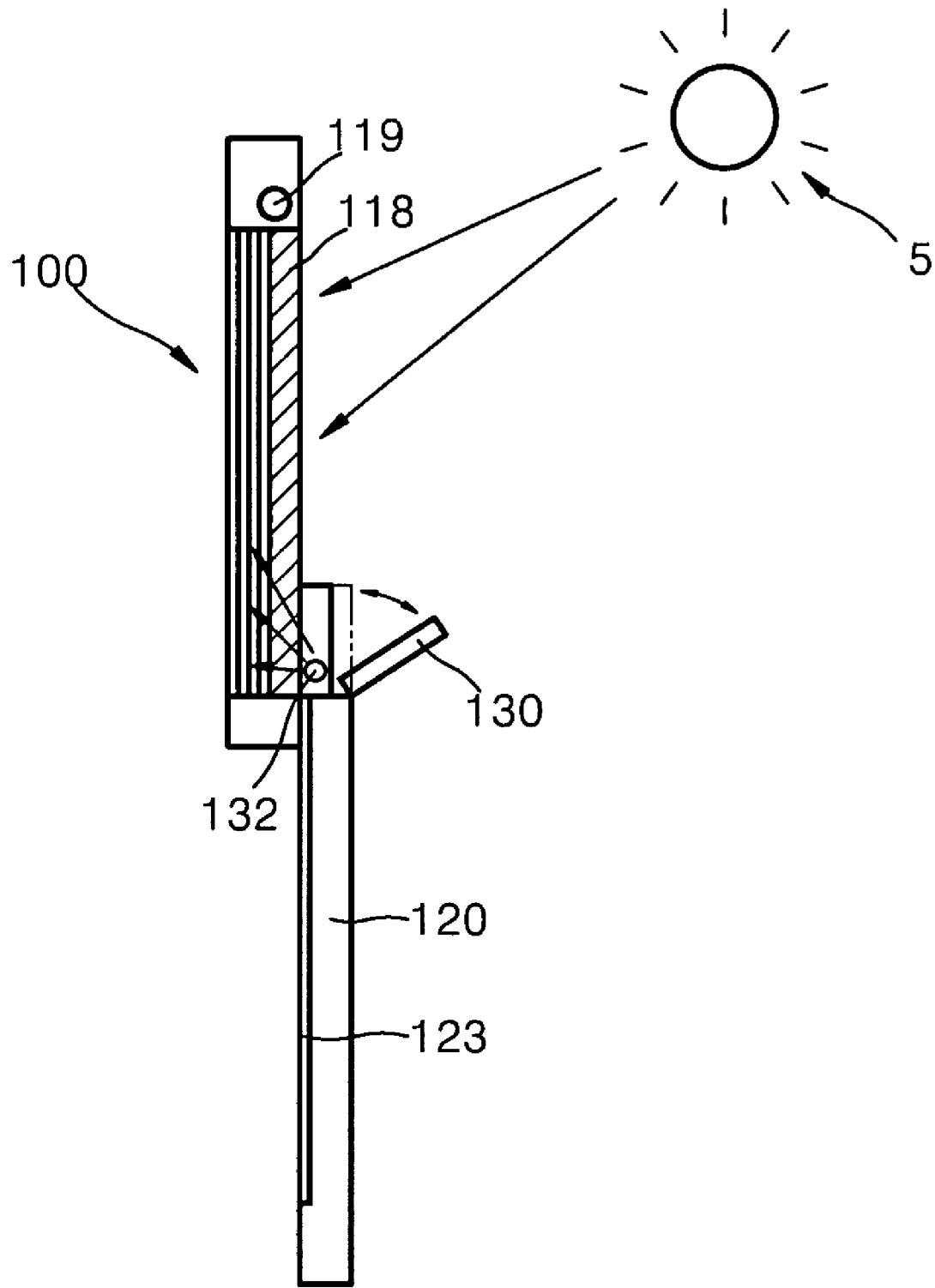
FIG. 8 is a cross-sectional view of the display device of FIG. 7 with a reflection plate.

When the cover 120 slides down with respect to the main body 100, external light 5 passes through the light guide panel 118 to be incident on the display panel, and an image is formed using the light. FIG. 8 is a cross-sectional view of the display device of FIG. 7 with a second reflection plate 130. Referring to FIG. 8, the second reflection plate 130 is disposed on the cover 120 to reflect external light to the main body 100. The second reflection plate 130 is selectively opened and closed. Further, an auxiliary light source 132 is disposed over the cover 120 to supply light when external light is insufficient.

The display device of the present invention can display an image using external light such as sunlight or illumination light, and display an image using a backlight unit indoors where external light is weak or absent or after sunset. When the display device employs a sensor for sensing external brightness, the display device can use a backlight unit as a light source when the external brightness is less than a predetermined standard brightness and use external light as a light source when the external brightness is greater than the standard brightness.

As described above, the display device consistent with the present invention can display an image by selectively using external light such as sunlight or illumination light, or a backlight unit. Accordingly, the display device can display an image using sunlight outdoors when the external light is sufficient, thereby ensuring clear visibility and saving power consumed for the backlight unit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
   a main body having a front side and a back side, and a display panel for forming an image, wherein external light is transmittable through the back side to the display panel, and one side of the display panel faces the front side; and
   a cover coupled to the main body, the cover being slidable along the back side of the main body,
   wherein external light is supplied through the back side to the display panel as image forming light for the display panel when the cover is slid along the back side to expose the back side of the main body to the external light.

2. The display device of claim 1, wherein the cover comprises:
   a light guide panel which guides light to the main body;
   a light source which supplies light to the light guide panel; and
   a first reflection plate which reflects light traveling through the light guide panel.

3. The display device of claim 2, wherein the light source is located on a side of the light guide panel that is closer to the main body when the cover is slid to expose the main body, such that light output from the light source is emitted to the main body.

4. The display device of claim 3, further comprising a reflecting unit disposed around the light source,
   wherein the reflecting unit is rotated to reflect light output from the light source to the main body when the cover is slid to expose the main body.

5. The display device of claim 1, wherein the main body comprises: a light guide panel; and a light source supplying light to the light guide panel, and the cover comprises a first reflection plate which reflects light traveling through the light guide panel.

6. The display device of claim 1, further comprising a reflection plate disposed adjacent to the main body to be opened and closed such that the reflection plate is opened to reflect external light to the main body when the cover is slid to expose the main body.

7. The display device of claim 2, further comprising a second reflection plate disposed adjacent to the main body such that the second reflection plate is opened to reflect external light to the main body when the cover is slid to expose the main body.

8. The display device of claim 1, further comprising an auxiliary light source disposed adjacent to the main body to emit light to the main body when the cover is slid to expose the main body.

9. The display device of claim 2, wherein the light source is disposed on a side of the light guide panel where the main body and the cover overlap each other to emit light to the main body when the cover is slid to expose the main body.

10. The display device of claim 5, wherein the cover further comprises an auxiliary light source disposed on an upper end of the cover.

* * * * *